(12) United States Patent
Gaylord

(10) Patent No.: US 6,773,953 B1
(45) Date of Patent: Aug. 10, 2004

(54) CAMERA SENSOR IDENTIFIER VIA ETCHED FLAW

(75) Inventor: Jeremy B. Gaylord, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,304

(22) Filed: Dec. 23, 1998

(51) Int. Cl.[7] .............................................. H01L 21/00
(52) U.S. Cl. ............................. 438/57; 438/66; 438/73
(58) Field of Search .............................. 438/48, 57–60, 438/73, 74, 75–80, 166, 295–299

(56) References Cited

U.S. PATENT DOCUMENTS

| 5,273,910 | A | * | 12/1993 | Tran et al. | |
|---|---|---|---|---|---|
| 5,541,119 | A | * | 7/1996 | Kodama | |
| 5,811,328 | A | * | 9/1998 | Zhang et al. | |
| 5,840,592 | A | * | 11/1998 | Russell et al. | |
| 6,011,585 | A | * | 1/2000 | Anderson | |
| 2002/0024071 | A1 | * | 2/2002 | Kawajiri et al. | 257/292 |
| 2002/0125410 | A1 | * | 9/2002 | Zhang et al. | 250/208.1 |
| 2003/0025136 | A1 | * | 2/2003 | Zhang et al. | 257/288 |

OTHER PUBLICATIONS

Hobbs, Marvin, "Solid–State Image Sensors", *Video Cameras and Camcorders*, Prentice Hall, 1989, pp. 44–58.

The Editors, "Advanced Photo System Buyer's Guide, Where It's at Two Years Down the Line", *Photographic*, Jun. 1998, pp. 62–77.

Eodice, Lynne, "Great Images with APS", Point and Shoot, *Photographic*, Jun. 1998, pp. 60–61.

White, Ron, "How a Digital Camera Works," *How Computers Work*, Ziff–Davis Press, 1997, pp. 178–181.

* cited by examiner

*Primary Examiner*—Savitri Mulpuri
(74) *Attorney, Agent, or Firm*—Shireen I. Bacon

(57) ABSTRACT

Existing digital cameras provide for the attachment of data such as messages, captions, or dates to images. However, the data is generally user controlled and may be fraudulently modified. Users may be interested in the tracking of images taken with a particular sensor, especially in security applications or manufacturing. Currently, no such identifier is currently available. The present invention introduces a method and apparatus for camera sensor identifier via an etched flaw. The method of the present invention first fabricates a solid-state image sensor. The image sensor comprises of a plurality of transistors. Then a subset of said transistors are modified to create an identifier. Modification may entail the use of a laser or electron beam to alter a subset of said transistors. The completed image sensor would be used in a image capturing device, such as a digital camera or video camera.

11 Claims, 9 Drawing Sheets

CAMERA SENSOR IDENTIFIER VIA ETCHED FLAW

BACKGROUND OF THE INVENTION

1. Field of the Invention

This invention relates generally to tracking images and identifying sensor of origin. More particularly, the present invention relates to a method and apparatus for camera sensor identification via an etched flaw.

2. History of the Prior Art

There has be an explosion in the number of digital imaging systems available to consumers as higher performance products are being offered at lower prices. Some of the more popular consumer applications include digital video, scanners, copiers, facsimile, and digital cameras. Efforts to develop more advanced digital cameras are fueled by the continued expansion of high performance personal computers in both homes and businesses. Today's computers have the data processing capabilities to manipulate and display the data of digital images.

Digital camera manufacturers have been striving to improve the digital imaging system in a number of ways. Systems are being designed to yield improved digital image quality in an effort to match that of the conventional chemical film cameras. There are also efforts to reduce the power consumption required for battery-operated systems such as digital cameras. However, one area that is of interest for improvements is security and image tracking.

Existing digital cameras provide for the attachment of data such as messages, captions, or dates to images. However, the data is generally user controlled and may be fraudulently modified. Similarly, other art such as the Advanced Photo System™ (APS) stores data related to film format or cassette information in a special recording layer in the film. For instance, some APS cameras record reprint information invisibly on the film's magnetic layer. But these methods do not provide for storing an identifier that could be used in identifying the sensor from which the image came from. Users may be interested in the tracking of images taken with a particular sensor, especially in security applications or manufacturing. Currently, no such identifier is currently available.

Hence it would therefore be desirable to have a method and apparatus for tracking images and identifying its sensor of origin.

SUMMARY OF THE INVENTION

The present invention introduces a method and apparatus for camera sensor identifier via an etched flaw. The method of the present invention first fabricates a solid-state image sensor. The image sensor comprises of a plurality of transistors. Then a subset of said transistors are modified to create an identifier. Modification may entail the use of a laser or electron beam to alter a subset of said transistors.

Other objects, features, and advantages of the present invention will be apparent from the accompanying drawings and from the detailed description that follows.

DESCRIPTION OF THE DRAWINGS

The present invention is illustrated by way of example and not limitations in the figures of the accompanying drawings in which like references indicate similar elements, and in which.

DETAILED DESCRIPTION OF THE INVENTION

Figure 1:
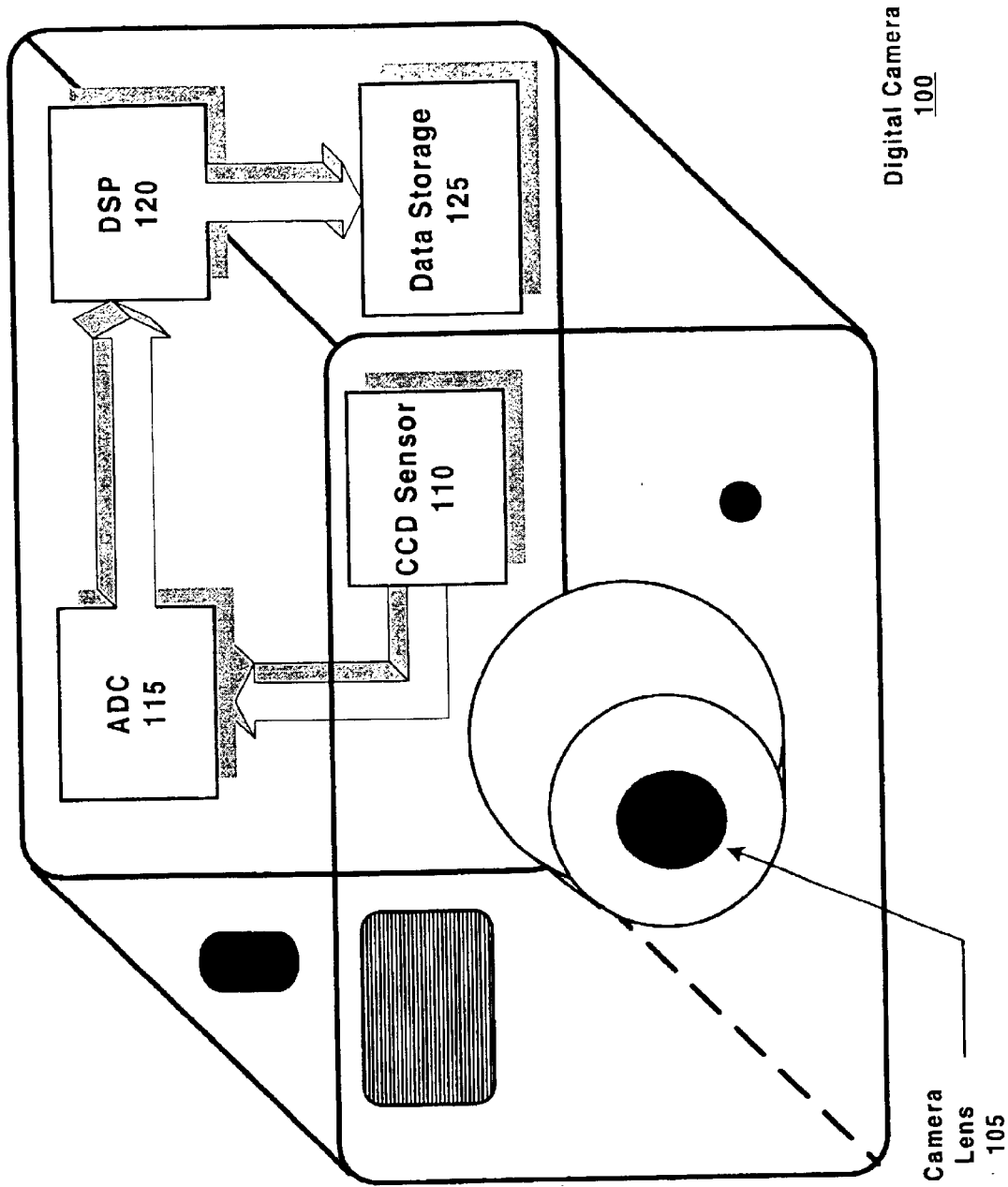
FIG. 1 is a block diagram illustrating a camera that may utilize a camera sensor having an etched identifier.

A method and apparatus for camera sensor identifier via an etched flaw is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to digital cameras, image sensors, and charged coupled devices. Although the following embodiments are described with reference to digital cameras, the same techniques and teachings of the present invention are applicable to other types of image capturing devices that use image sensors and other types of image sensors.

The present invention allows for better media management of images and video data that are gathered by camera sensors. This invention introduces a method and apparatus for camera sensor identifier via an etched flaw. Currently, digital cameras allow users to attach data, such messages or captions or dates, to its images. However, such data is generally user controlled and may be fraudulently modified. Similarly, other art such as the Advanced Photo System™ (APS) stores data related to film format or cassette information in a special recording layer in the film. APS™ is a registered trademark of Eastman Kodak Company of Rochester, N.Y. For instance, some APS cameras record reprint information invisibly on the film's magnetic layer. Other related art would include the practice of serializing integrated circuits (IC). A laser would be used to etch some identifier or serial number on an IC after manufacturing.

Certain users may be interested in the tracking of images taken with a particular sensor, especially in security applications or manufacturing operations. But none of these methods provide for associating an identifier that could be used in identifying the specific sensor or camera from which the image came from. Furthermore, the identifier of the present invention may be a unique identifier. Currently, no such identifier is available for camera sensors. In addition, a software driver or client application, such as an image viewer, could exercise control of the identifier and images without user intervention. This invention may be especially valuable for security applications. Therefore, a method of tracking images and identifying the specific sensor or camera from which an image originated would be desirable.

Anyone that made or used an image sensor may be interested in this kind of technology. This identifier is similar to a watermark, but for images. It could be used for authenticating images and image management.

One possible application of the present invention would be for lot control in a manufacturing process. For instance, identifiers in sensors would mark each lot of wafers. If a certain number of integrated circuits had bad characteristics after production, a user could tell what lot the material came from in manufacturing.

Similarly, in the case of security applications, a user could know that a particular series of images were taken from a particular camera since the identifier could not be tampered with. In another instance, it would be possible to say that a certain image came from camera XYZ, which is in possession of person A, so person A must have taken the images. The sensor could be implemented within a camera such as a digital camera or a video camera. A secure identifier may also be used to prevent an image from being fraudulently altered without detection.

This invention places an identifier on a solid-state image sensor, such as a Metal-Oxide Semiconductor (MOS), CCD, or CMOS sensor image sensor, by intentionally creating bad or "damaged" image cells (pixels) on the sensor. A sensor is composed of an array with a number of different cells, each of which could form a pixel in the final image. The image cells or elements may be built from transistor devices such as p-n junction photodiodes, phototransistors, photoconductors, photovoltaic cells, or other similar semiconductor elements. The damaged pixels are also known as the etched flaw. These pixels would be "damaged" in known locations. This allows a software driver to find the damaged cells in a image, read and assemble the identifier, and fix up the bad cells in the image before it is transferred to a client.

The most difficult aspect of this invention is probably how to introduce the damaged cells onto the sensor. The damaged cells could be created in a number of ways. The method of the preferred embodiment is to use an electron beam or laser to damage the cells. In order to place the damaged cells on the sensor, the method in one embodiment would be to add an extra step in the manufacturing process after the sensor was fabricated, where a laser or electron beam would go in and damage some of the cells. A fine laser may be needed to focus on the cells since precise alignment of the laser with the pixels is needed in order to accurately reproduce the process. This method would be the best way to create a unique identifier for each sensor even though an extra step is required in the manufacturing process. However, the overhead would be probably acceptable in this particular situation.

An alternative method of placing the identifier on the sensors would be to include the identifier in the photomask. In such an embodiment, only each sensor within a given photomask would have a unique identifier. It would probably not be practical to change the mask after each wafer. In altering a photomask, it would appear that the photomask is being tracked instead of the sensor. Hence this particular technique would probably be useful mainly for manufacturing purposes.

The camera sensor receives an etched flaw during manufacturing. There are a number of different places on the sensor where the damaged cells may be located. One of the ways is to place the damaged cells in an area outside of the image. In one embodiment of the present invention, the flaw may be on the edge of the sensor and is clipped off during display of an image. But the flaw would uniquely identify the sensor used to take the image if the whole image is viewed. For example, in a sensor typically of size 640×480, the sensor might have a size of 640×481 if this invention were added. The extra row of 640 cells could be used to store an identifier on the sensor. A laser would be used to destroy certain cells on the sensor. Since 640 bits are probably more than required for an identifier, other information may also be placed in those bits. Alternatively, an extra column may be created to store an identifier. So instead of having a sensor of size 640×480, a sensor of size 641×480 may be created. However, the method using an extra row provides more cells (i.e. 640 cells in an extra row versus 480 cells in an extra column) for storing an identifier. Furthermore, if a security scheme is used in image capture, the extra cells available in the extra row method may allow for a more robust security scheme.

The software portion of the driver hooks to the image capture hardware and computer system. The driver actually receives the data from the hardware via a buffer or in multiple packets in a stream. A number of packets would form one image frame. Each image frame would have an identifier embedded in the data either scattered in the image or located in one row or column of the image. The software locate the identifier would go to those locations and extract the identifier. In the example of an extra row, the driver takes the packets and assembles it into an image frame with an extra row. The extra row can be shipped off to the client, or read and stored. The client may be configured to save the identifier and not display it. The driver could also take the extra row, assemble the identifier out of it, and store the identifier along with the image frame as a number, possibly in some other location such as the image frame header. Therefore, the identifier data would be present and accessible, but not within the image itself. This way, the client application would not have to deal with an extra row of pixels, especially if the client does not know how to handle it.

Alternatively, the software driver could either not ship the last row to the client because the client may be unaware of the last row and is not capable of handling it. If the driver is designed such that the last row is not normally shipped to the client, the client could alternatively request the last row if it is not normally shipped to it. The ideal situation would be for the client to get the extra row of pixels in the image, but have the option of whether to display it or not. But the identifier would usually be saved or stored with the image. Hence the identifier data would always be attached to the image and would act as the identifier of what sensor the image came from. This would allow all images captured with a particular sensor to have the sensor identifier embedded right in the image. There may also be encryption techniques that would allow tampering with the identifier to be detected. Hence there may be security applications where this kind of embedded identifier would be very valuable.

The image with the identifier data could possibly have problems if viewed with a normal JPEG or GIF viewer that did recognize the format. In the case of the extra row, the extra row could possibly appear as garbage or gibberish to the client. An image viewer or client could be configured not to display the extra row or to save the identifier off from the regular image data. This invention may introduce different image sizes than standard ones. Alternate methods of repairing the damaged pixels are available and up to the implementer or developer of the driver.

The method in another embodiment of the present invention would be to embed or scatter the damaged cells around the image. However, a software driver would be needed in order to extract the information, fix up the image, and then deliver the identifier as an extra line in the image. One advantage of this method is that the actual sensor could still have, for example, 480 physical lines. Hence, a physically larger sensor would not have to be created. The software driver would get the image from the camera and know that there were particular pixels in the image that were damaged. The identifier has to be extracted from the image and not be stored within the image. To permanently store the identifier within the image would be limiting the identifier's usefulness. The driver would recover the identifier from the damaged pixels and assemble the identifier. Furthermore, the software driver would use software to conduct interpolation with the is adjacent cells to recover or fill in the damaged pixels. This process would restore the image so that the client would never notice the difference. The driver could also turn the identifier over to the client either as an extra row, by creating one, or the driver could send it to client on request.

How a Digital Camera Works

FIG. 1 is a block diagram illustrating a camera that may utilize a camera sensor having an etched identifier. Generally, a digital camera 100 includes a digital imaging array 110 having a plurality of pixels and image processing circuitry (115, 120) to process the digital pixel output signals produced by the imaging array 110. Unlike traditional chemical film cameras, digital cameras 100 use light-sensitive electronics 110 instead of film to capture images. The imaging processing circuitry (115, 120) in a digital camera is adapted to process saturated digital pixel output signals differently from non-saturated digital pixel output signals. There various ways in how digital cameras can store the visual data once the shutter is snapped. The image can be stored in Random Access Memory (RAM), to the camera's own hard or floppy drives, to a PC Card, or through a direct connection to a desktop Personal Computer (PC). Eventually, most digital photos end up on a PC's hard disk. There, the images may be displayed or printed.

First, an image passes through the lens 105 of a digital camera 100 as light the same as it does in a film camera. But instead of being focused on photographic film, the image is focused on a charge-coupled device (CCD) 110 or sensor. The face of the CCD 110 is studded with an array of transistors that create electrical currents in proportion to the intensity of the light striking them. The transistors make up the pixels of the image. On a PC's monitor screen or in an input device, such as a scanner or a digital camera, a pixel is the minimum, distinct visual information a component can display or capture. The pixel may be made up of only one transistor for black-and-white photography or several transistors for color. The more pixels there are in an image, the better its resolution.

The transistors in a CCD 110 generate a continuous, analog electrical signal that goes to an analog-to-digital converter (ADC) 115. The ADC 115 is a chip that that translates the varying analog signal to a digital format, which consists of a stream of 1's and 0's. Here, the ADC 115 converts the analog signals it receives from the CCD 110 to digital image signals. The ADC 115 sends the digital information to a digital signal processor (DSP) 120 that has been programmed specifically to manipulate photographic images. The DSP 120 adjusts the contrast and detail in the image, compresses the data that makes up the image so it takes less storage space, and sends the data to the camera's storage medium 125.

The image is temporarily stored on a hard drive or in Random Access Memory (RAM) built into the camera body, and from there it can be transferred to a PC's permanent storage through a serial or SCSI cable. Or the image may be saved to a special mini-floppy drive or a PC Card plugged into the camera 100. Portable types of storage like a floppy or PC Card can be removed from the camera and inserted into a matching connection on a PC, where its data can be copied to a hard drive or writable CD-ROM. Some cameras that create very large files may be cabled to a PC while a photo is being shot, instantly transmitting the image directly to the computer.

Image Capturing with a Computer

Figure 2:
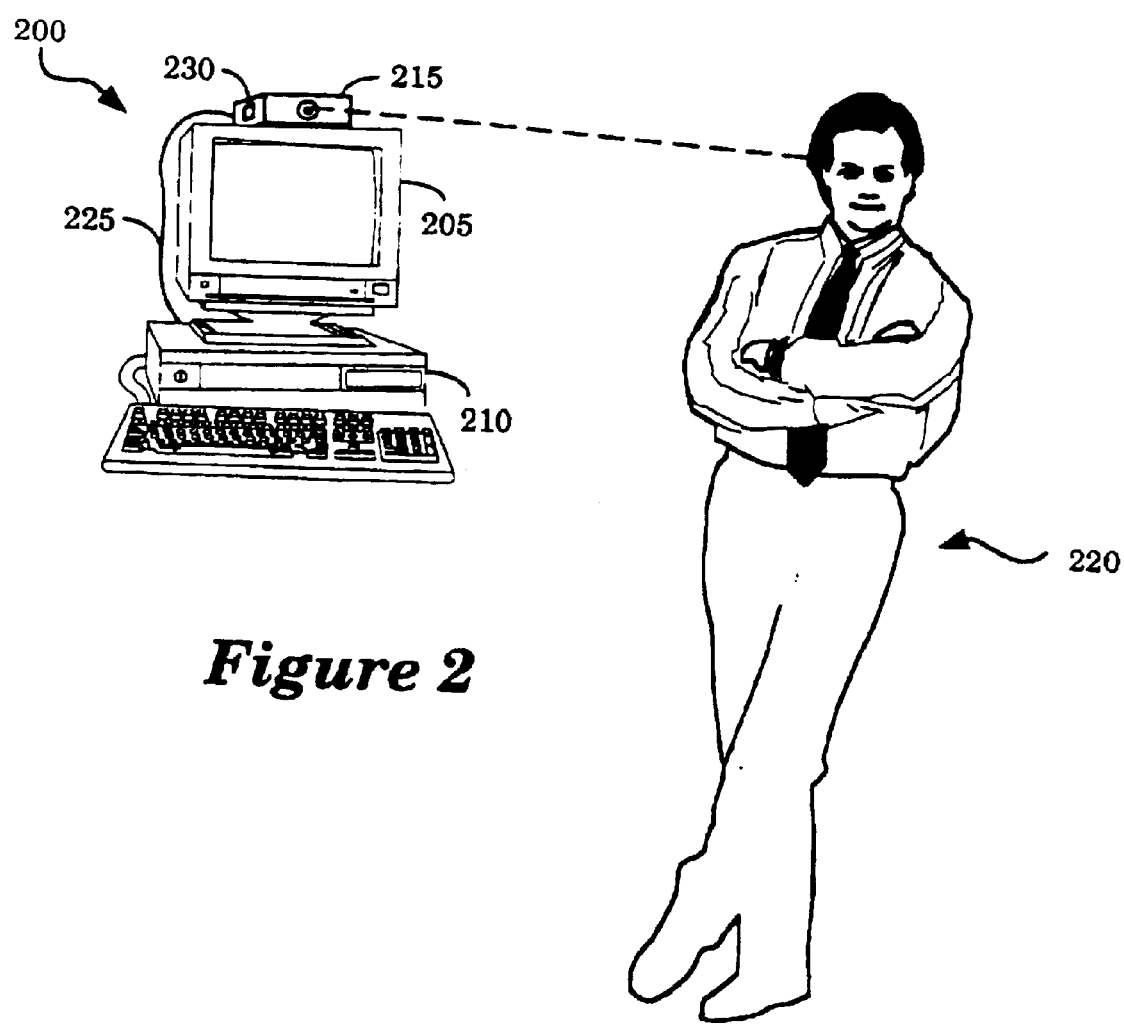
FIG. 2 is an illustrative block diagram of an embodiment of a computer system operating in combination with a image capturing device.

Referring now to FIG. 2, an illustrative block diagram embodiment of an image capturing device 215 employing the present invention and operating in association with a computer system 200 is illustrated. The computer system 200 comprises a display monitor 205 having a PC platform 210 containing memory, processing hardware and the like. An image capturing device 215 such as a video camera, digital camera, and the like, is illustrated separate from the display monitor 205. The capturing device may be implemented internally within the casing of the display monitor 205 or mounted onto the display monitor 205 as shown. As the capturing device 215 captures a data clip of desired data such as the physical characteristics of a computer user 220, it transmits the captured data clip to the PC platform 210 via a communication line 225.

The communication line 225 may be represented as an electrical or fiber optic cable, a wireless communication line, and the like. Since the communication line 225 may be publicly accessible, jeopardizing the integrity of the captured data clip, a secure data capture device 230 may be employed within the capturing device 215. The secure data capture device 230 could capture a data clip and securely transmits the captured data clip to the PC platform 210 by digitally signing each captured data frame or the entire data clip.

In one embodiment, the capturing device 215 may be coupled to an external computer 200 via a high-speed serial bus that enables the capturing device to transmit digital image signals to the computer without interim storage in an on-board buffer. For instance, a digital camera captures a still image and transfers the still image from the digital camera to an associated computer system. Transfer of the captured still image is performed by camera device driver and bus interface software executing on the computer system. In one embodiment, the digital camera may be tethered to the computer system by a Universal Serial Bus (USB). The camera device driver and bus interface software could control access and usage of the USB. The computer may also perform various imaging routines on the raw digital signals from the capturing device in real time, eliminating a need for an on-board processor in the capturing device.

It is contemplated that other embodiments of the image capturing device 215 may exist. For example, the capturing device may include various types of internal storage or data manipulation capabilities. In that case, the data capture device 215 may not require the communication line 225 to establish an electrical connection with the computer system 200.

A Computer System Application

Figure 3:
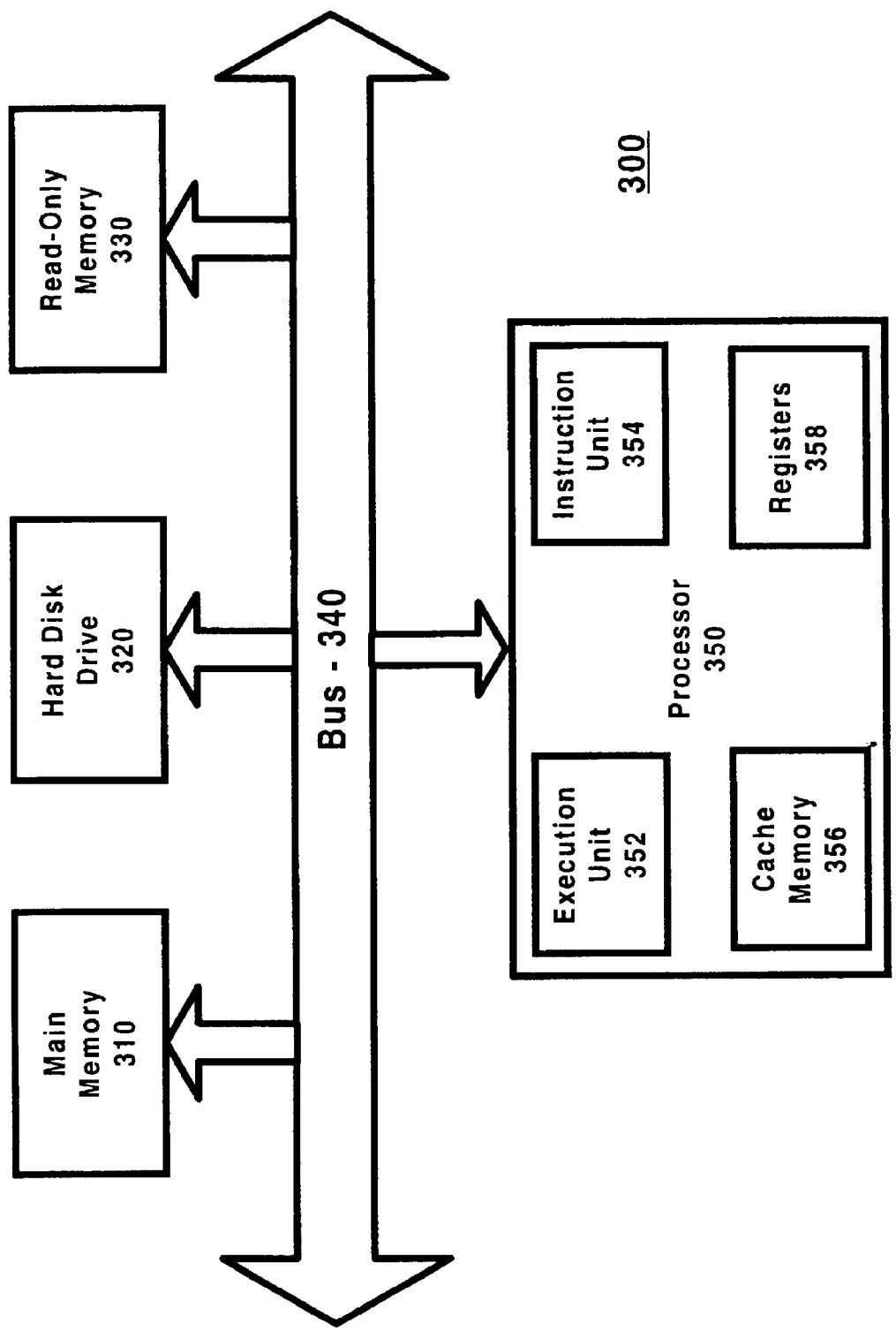
FIG. 3 is a block diagram illustrating a computer system which may utilize the present invention.

Referring now to FIG. 3, there is a block diagram illustrating a computer system 300 which may utilize the present invention. The system 300 includes a central processor 350 which carries out the various instructions provided to the computer system 300 for its operations. The central processor 350 comprises of an execution 352, and instruction unit 354, cache memory 356, and general registers 358. The central processor 350 is coupled to a bus 340 adapted to carry information to various components of the system 300. Coupled to the bus 340 is main memory 310, which is typically constructed of dynamic random access memory, to store information during a period in which power is provided to the system 300. Also coupled to the bus 340 is read-only memory 330, which may include various memory devices, each of which is adapted to retain a particular memory condition in the absence of power to the system 300. The read-only memory 330 typically stores various basic functions used by the processor 350 such as basic input/output processes and start-up processes typically referred to as BIOS processes. Long term memory 320, typically a electromechanical hard disk drive, is also coupled to the bus 340.

A Camera Sensor

Figure 4:
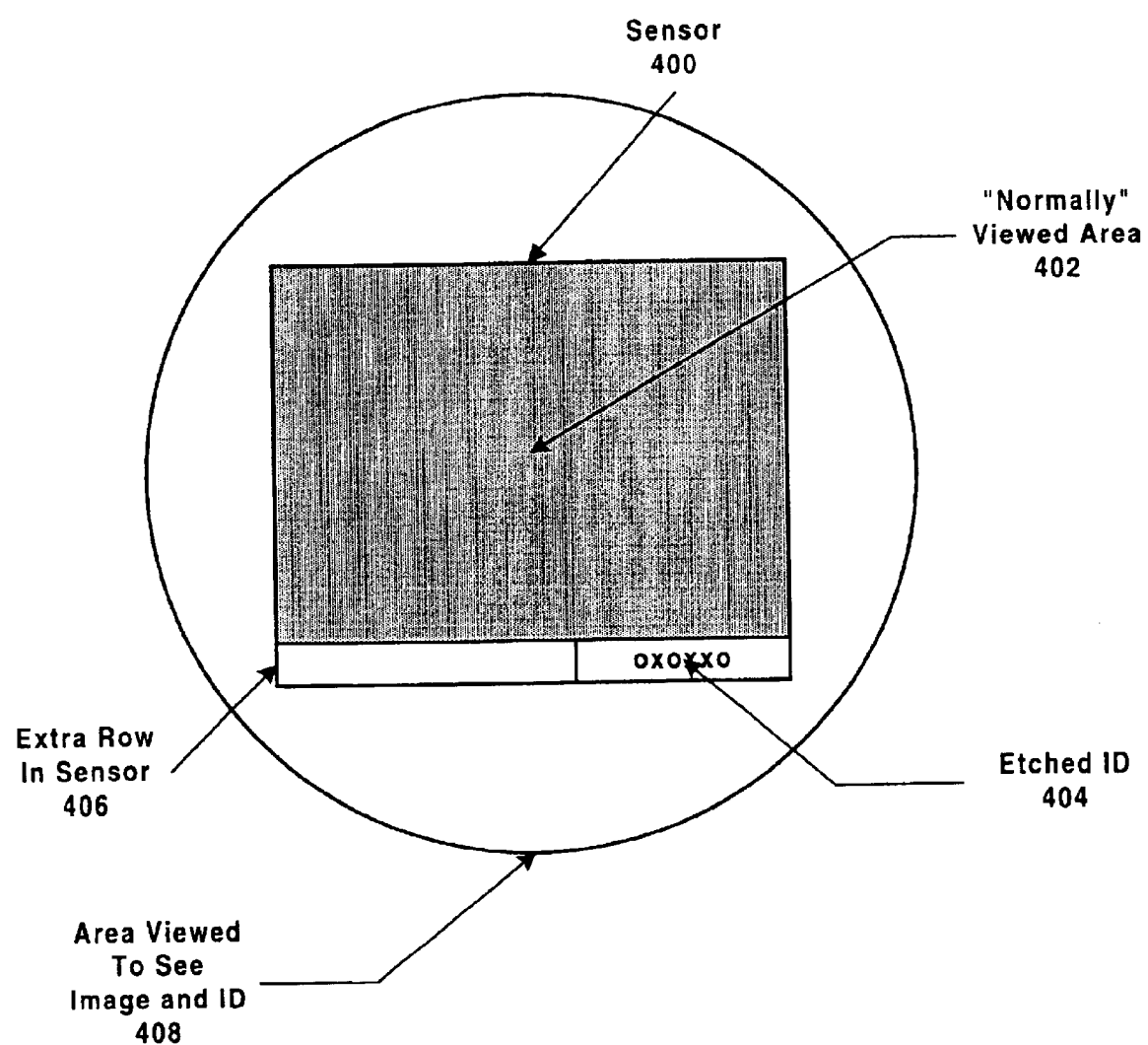
FIG. 4 is an illustrative block diagram of one embodiment of a camera sensor including an etched identifier.

FIG. 4 is an illustrative block diagram of one embodiment of a camera sensor 400 including an etched identifier 404. The main portion of the sensor is the area 402 normally viewed of the normal image. In this embodiment of the present invention, an extra row of pixels 406 are built into the sensor 400. The extra row of pixels 406 are used to store the etched identifier 404. Hence in this example, the etched identifier 404 identifying the sensor as sensor 'oxoxxo' is located outside of the normal viewing area 402. In this example, some of the pixels have been damages in a pattern to represent an identifier as a series of o's and x's. For illustrative purposes here, the o's represent undamaged cells and the x's represent damaged cells. In yet another embodiment of the present invention, an alphanumeric representation of an identifier may be etched into a sensor if a sufficient amount of pixels are available. In order to view the identifier 404 with the image, the entire sensor area 408 would have to be displayed.

Creating and Using an Etched Identifier

Figure 5B:
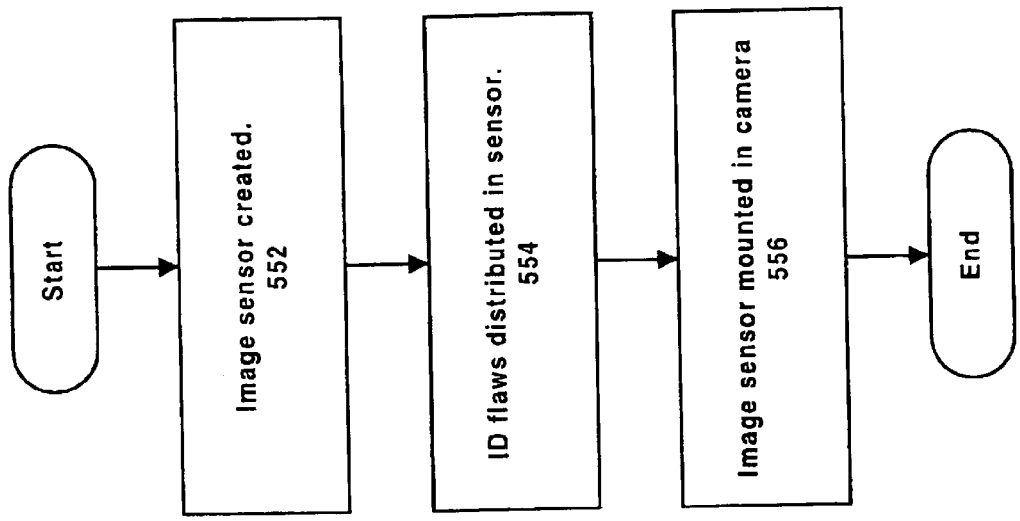
FIG. 5b is a flow chart illustrating the steps taken in another embodiment of creating a sensor with an etched identifier.
Figure 5A:
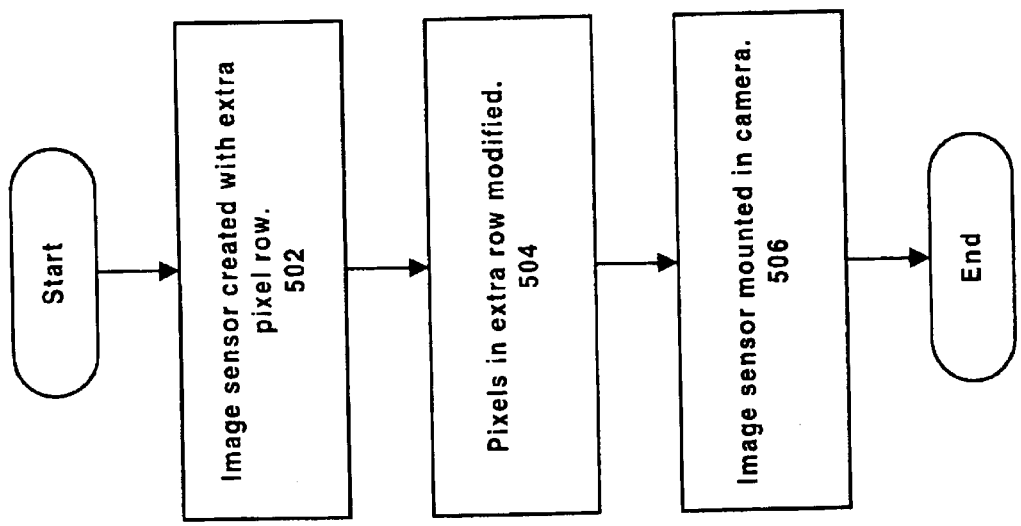
FIG. 5a is a flow chart illustrating the steps taken in one embodiment of creating a sensor with an etched identifier.
Figure 6A:
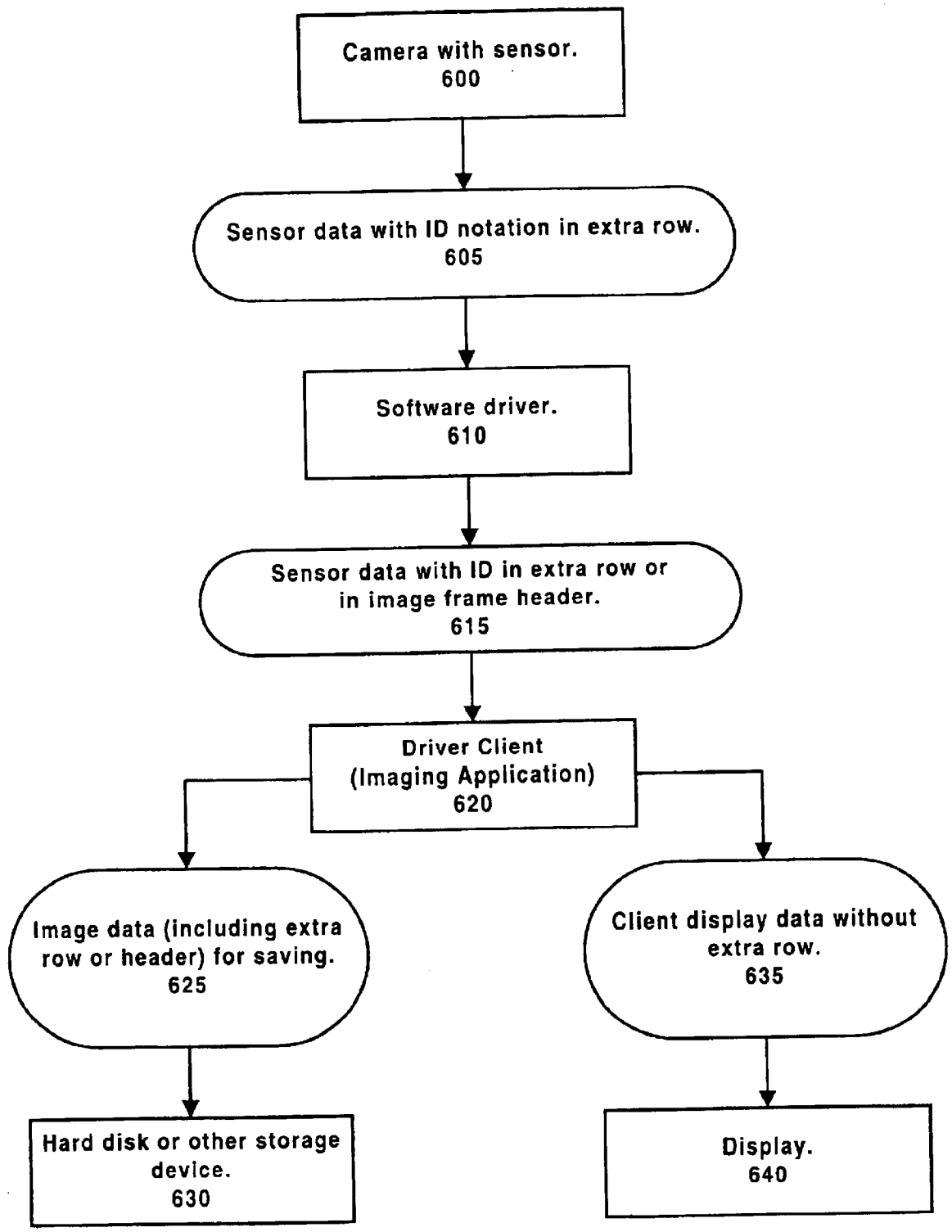
FIG. 6a is a flow chart illustrating the steps taken in one embodiment of using a camera sensor to capture an image.
Figure 7A:
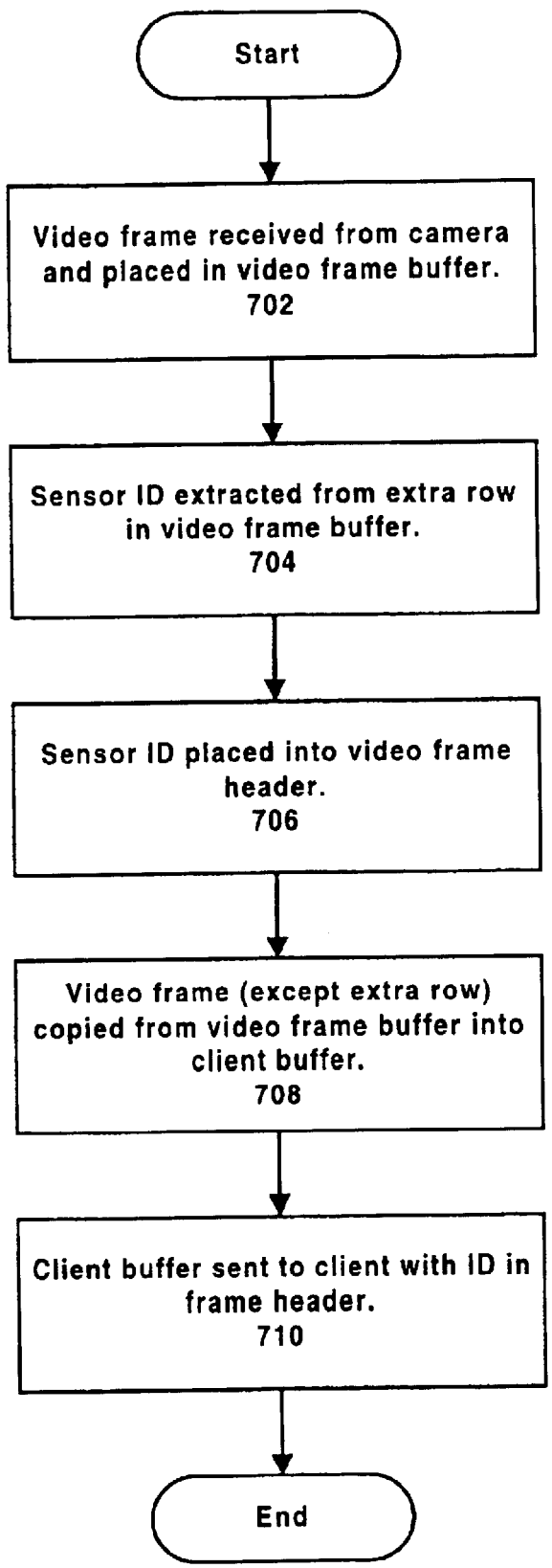
FIG. 7a is a flow chart illustrating the steps taken in one embodiment of processing an identifier in an image before the image is displayed.

FIGS. 5a, 6a, and 7a will be used together in describing a first embodiment of the present invention. In this first embodiment, the etched identifier is created in an extra pixel row of the camera sensor.

FIG. 5a is a flow chart illustrating the steps taken in one embodiment of creating a sensor with an etched identifier. A camera sensor manufacturer would first create a sensor with an extra pixel row as in step 502. For instance, a normal camera sensor may have a size of 640×480 pixels. But in this special sensor with the extra row, the sensor would have a size of 640×480. At step 504, pixels in the extra row would be modified or "damaged" in order to store an identifier. This step may be performed with an electron beam or laser. Then at step 506, the modified sensor is mounted into a camera FIG. 6a is a flow chart illustrating the steps taken in one embodiment of using a camera sensor that was created from the method of FIG. 5a to capture an image. First, a user uses a camera with a sensor to take a picture at step 600. Then at step 605, the sensor captures the image/sensor data including identifier flaws located in the extra pixel row. At step 610, the image data is sent from the camera to a software driver on a computer. The software driver may be designed to process image data, decode the sensor identifier from the data, interpolate pixel values, etc. In this embodiment of the present invention, the software driver may be distributed to the computer via a network or loaded from a disk drive. Although the above example describes the distribution of a software driver via a network, software drivers may be distributed by way of other computer readable mediums. For instance, a computer program may be distributed through a computer readable medium such as a floppy disk, a CD ROM, a carrier wave, or even a transmission over the internet.

The image data is processed and the identifier in the extra pixel row are stored away at step 615. The identifier may either be appended to the end of the image data or stored in the image frame header. The identifier may also be stored separately from the image data, but there may be issues in associating the correct identifier with the proper image afterwards. Now when the user decides to view the image, the image data is brought up in a driver client such as an imaging application at step 620. There may be two options available to the user. First, a user may save the image data, including the identifier stored in the extra row or image frame header at step 625. Then at step 630, the data would be sent to a hard disk or some other similar type of storage device. On the other hand, a user may choose to view the image via a display at step 635. The identifier data in the extra row or header is masked out so that only the image is sent to a display at step 640. Alternatively, a user may wish to view the associated identifier, in which case all of the image data and its identifier is sent to a display.

FIG. 7a is a flow chart illustrating the steps taken in one embodiment of processing an identifier in an image before the image is displayed. In this embodiment, the camera used to generate the images used a sensor with an extra pixel row as described in FIG. 5a. At step 702, a video frame is received from the camera and placed in a video frame buffer for processing by a software driver. If the image was taken at an earlier time, it may be coming from some storage device instead of a camera. Then at step 704, the software driver as described in FIG. 6a extracts the sensor identifier from the extra pixel row in the video frame. The sensor identifier is then placed into a video frame header at step 706. The video frame comprising of the normal viewable area of the image is copied at step 708 from the video frame buffer into a client buffer. The client in this case may be an image application or some similar driver client. At step 710, the client buffer is sent to the client with the sensor identifier in a image frame header associated with the image data. Now if the user wants to view just the image, the data in the client buffer may be displayed on a video monitor. Whether the associated sensor identifier is displayed or not may be at the user's discretion. Alternatively, the image data and the image frame header with the identifier may be saved to a long term storage device like a hard disk drive or floppy disk. Also depending on the application, a user may store the sensor identifier in other mediums other than the image frame header.

Another Embodiment

Figure 6B:
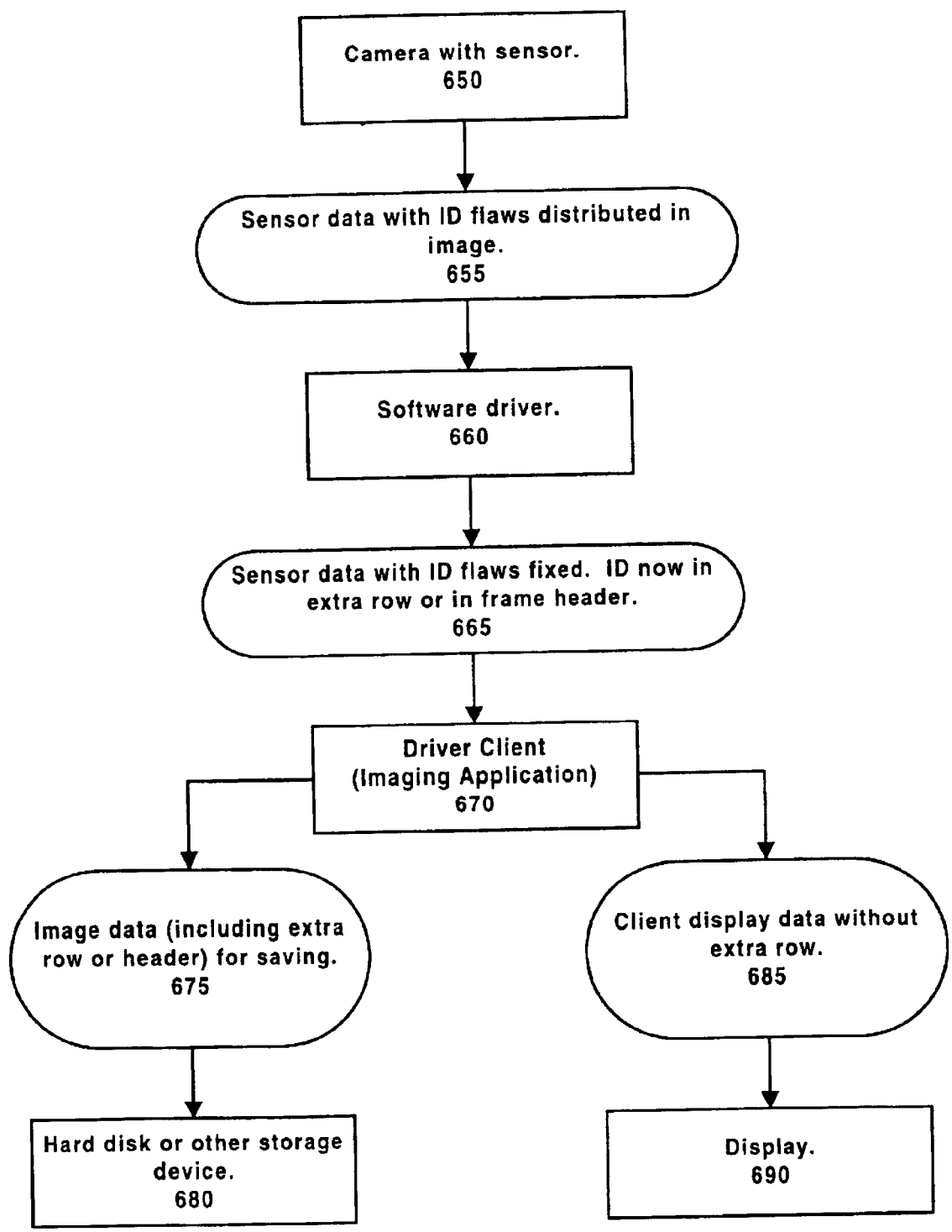
FIG. 6b is a flow chart illustrating the steps taken in another embodiment of using a camera sensor to capture an image.
Figure 7B:
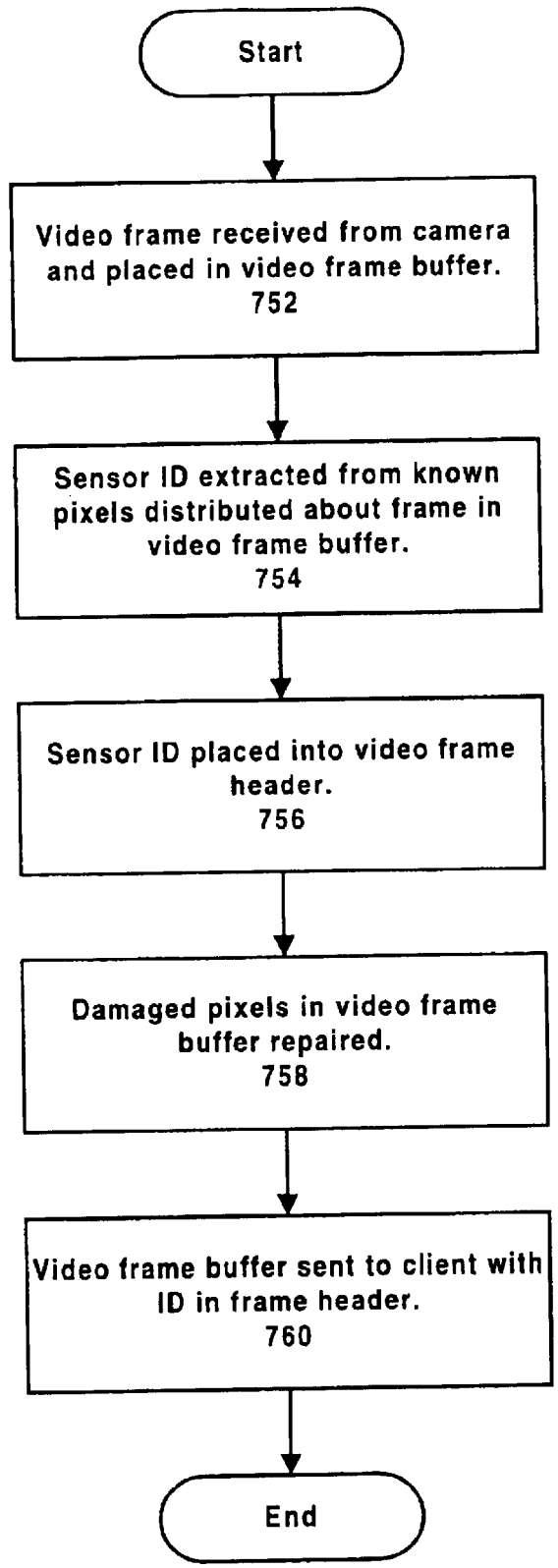
FIG. 7b is a block diagram illustrating the steps taken in another embodiment of processing an identifier in an image before the image is displayed.

FIGS. 5b, 6b, and 7b will be used together in describing a second embodiment of the present invention. In this embodiment, the etched identifier is distributed among different pixels of the camera sensor.

FIG. 5b is a flow chart illustrating the steps taken in another embodiment of creating a sensor with an etched identification. As in FIG. 5a, a sensor is first manufactured at step 552. However, in the current embodiment of the method, the camera sensor would not contain an extra row of pixels. Hence in our example, the sensor would only have a size of 640×480. At step 554, identifier flaws are distributed among pixels in the sensor. This step entails modifying or damaging certain pixels in known locations within the sensor. This step may be performed with an electron beam or laser. Then at step 556, the modified sensor is mounted into a camera.

FIG. 6b is a flow chart illustrating the steps taken in a second embodiment of using a camera sensor that was created from the method of FIG. 5b to capture an image. First, a user uses a camera with a etched sensor to take a picture at step 650. Then at step 655, the sensor captures the image/sensor data including the identifier flaws that are distributed within the image. At step 660, the image data is sent from the camera to a software driver. The image data is processed and the "damaged" pixels are "fixed" at step 665. The identifier that was stored in the "damaged" pixels within the image are now appended to either an extra row at the end of the image data or stored in the image frame header. When the user decides to view the image, the image data is brought up in a driver client such as an imaging application at step 670. There may be two options available to the user. First, a user may save the image data, including the identifier stored in the extra row or image frame header at step 675. Then at step 680, the data would be sent to a hard disk or some other similar type of storage device. On the other hand, the user may choose to view the image via a display at step 685. The identifier data in the extra row or header is masked out and only the image is sent to a display at step 690. Alternatively, a user may wish to view the associated identifier, in which case all of the image data and its identifier is sent to a display.

FIG. 7b is a block diagram illustrating the steps taken in another embodiment of processing an identifier in an image before the image is displayed. In this embodiment, the camera used to generate the images used a sensor with known "damaged" pixels dispersed within the sensor as described in FIG. 5b. At step 752, a video frame is received from the camera and placed in a video frame buffer for processing by a software driver. If the image was taken at an earlier time, it may be coming from some storage device instead of a camera Then at step 754, the software driver as described in FIG. 6b extracts the sensor identifier from the damaged pixels dispersed with the sensor. The sensor identifier is then placed into a video frame header at step 756. The video frame comprising of the normal viewable area of the image is then copied from the video frame buffer into a client buffer. The client may be an image application or some similar driver client. But there are still damaged pixels present in the image. At step 758, the software driver repairs the damaged pixels in the video frame. In this embodiment of the present invention, the damaged pixels are repaired by interpolating the value of each damaged pixel based on the values of its surrounding pixels and filling in the value of each damaged pixel in the client buffer. At step 760, The client buffer is sent to the client with the sensor identifier in a image frame header associated with the image data. Now if the user wants to view just the image, the data in the client buffer may be displayed on a video monitor. Whether the associated sensor identifier is displayed or not may be at the user's discretion. Alternatively, the image data and the image frame header with the identifier may be saved to a long term storage device like a hard disk drive or floppy disk. Also depending on the application, a user may store the sensor identifier in other mediums other than the image frame header.

What is claimed is:

1. A method of creating an image sensor identifier, said method comprising:

fabricating a solid-state image sensor, said sensor comprising a plurality of transistors; and modifying a subset of said transistors to create an identifier, comprised of alphanumeric representation wherein said subset of said transistors are located at an edge of said sensor.

2. The method as claimed in claim 1 wherein said solid-state image sensor is charged couple image sensor.

3. The method as claimed in claim 1 wherein said solid-state image sensor is a metal-oxide semiconductor image sensor.

4. The method as claimed in claim 1 wherein said step of modifying a subset of said transistors comprises using a laser to alter said transistor.

5. The method as claimed in claim 1 wherein said step of modifying a subset of said transistors comprises using an electron beam to alter said transistor.

6. The method as claimed in claim 1 wherein said identifier at said edge of said sensor is located in an extra column of said sensor.

7. The method as claimed in claim 1 wherein said identifier is located outside of the normal viewing area.

8. The method as claimed in claim 1 wherein said identifier is comprised of damaged cells.

9. The method as claimed in claim 8 wherein said identifier is further comprised of undamaged cells.

10. The method as claimed in claim 1 wherein said identifier at said edge of said sensor is located in an extra pixel row of said sensor.

11. The method of claim 10 wherein said solid-state image sensor has a size of 640×480 pixels.

* * * * *